United States Patent [19]

Wakui et al.

[11] Patent Number: 5,788,937
[45] Date of Patent: Aug. 4, 1998

US005788937A

[54] METHOD FOR THE RECOVERY OF SILVER VALUE FROM AQUEOUS SOLUTION

[75] Inventors: Yoshito Wakui; Osamu Itabashi, both of Sendai, Japan

[73] Assignee: Agency of Industrial Science and Technology, Japan

[21] Appl. No.: 571,487

[22] Filed: Dec. 13, 1995

[30] Foreign Application Priority Data

Dec. 15, 1994 [JP] Japan ................... 6-334068

[51] Int. Cl.$^6$ ........................................ B01D 11/00
[52] U.S. Cl. ............................................. 423/24
[58] Field of Search ...................... 423/24; 210/688

[56] References Cited

FOREIGN PATENT DOCUMENTS 9402240  2/1994  WIPO .................. 423/24

OTHER PUBLICATIONS

Bromberg, L., "Dialkyldithiophosphate . . . and Performance" J. of Appl. Polymer Sci., 49, 1993, pp. 1529–1535, no month.

Bromberg, L., "Extraction chromatography with . . . dithiophosphoric acid," J. of Chromatography, 634, 1993, pp. 183–196, no month.

Handley, T., et al., "O, O—Dialkyl Phosphorodithioic Acids as Extractants for Metals," Analytical Chemistry, 34, 1962, Sep., pp. 1312–1315.

Chemical Abstracts, vol. 117, No. 12, Abstract No. 115533 (1992), Abstract only.

G. Cote et al., Chemistry and Industry, No. 22, pp. 780–784 (1986).

L. Bromberg et al., Journal of Membrane Science, 70(1), pp. 31–39 (1992).

Database WPI, AN 92–030420(1992)(abstract of JP-A-03-278802).

Primary Examiner—Steven Bos
Attorney, Agent, or Firm—Wenderoth, Lind & Ponack

[57] ABSTRACT

Proposed is an efficient method for the highly selective recovery of silver value in an aqueous solution containing silver ions in a low concentration, such as depleted photographic fixing solutions, by extracting the silver ions from the aqueous phase with an organic solution containing O,O-bis(2-ethylhexyl) hydrogen thiophosphate as an extractant solution and the silver ions contained in the extract solution are back-extracted with a hydrochloric acid solution containing thiourea. Alternatively, the silver-containing starting aqueous solution is contacted with beads of a porous resin bearing the thiophosphate compound so that the silver ions are selectively adsorbed on the resin beads and then the silver ions are leached out of the resin beads with an organic solvent.

10 Claims, 2 Drawing Sheets

METHOD FOR THE RECOVERY OF SILVER VALUE FROM AQUEOUS SOLUTION

BACKGROUND OF THE INVENTION

The present invention relates to a method for the recovery of silver value from an aqueous solution or, more particularly, to an efficient method for the separation and recovery of silver value, in particular, even from an aqueous solution containing silver in the form of silver ions in a very low concentration.

As is known, silver is a kind of noble metals and widely used in the photographic materials, electronic parts, ornamental jewelries and the like. It is a very important social issue from the standpoint of resource preservation to re-use the silver value contained in waste materials by separating and recovering the silver value from an aqueous waste solution containing silver ions in a very low concentration such as wastes of photographic films, depleted photographic fixing solutions and waste etching solutions and washings in the manufacturing process of electronic parts.

Known methods for the recovery of silver value from an aqueous solution containing silver ions include the electrolytic method, precipitation method, ion exchange method, metal collector method and the like. It is, however, generally a very difficult problem to efficiently recover silver value from an aqueous solution containing silver ions in an extremely low concentration or to selectively separate and recover silver value alone from an aqueous solution containing not only silver ions but also ions of several other kinds of metals.

Among the above mentioned methods for the recovery of silver, the ion exchange method using an ion exchange resin has an advantage because the method is suitable for continuously collecting silver from a large volume of aqueous solutions but the method is not applicable to an aqueous solution containing several kinds of metal ions. The metal collector method is not practicable due to the very high cost because special expensive reagents must be used in a large amount.

SUMMARY OF THE INVENTION

The present invention accordingly has an object to provide an efficient and inexpensive method for the recovery of silver value even from an aqueous solution containing silver ions in an extremely low concentration or containing silver ions together with ions of other kinds of metals in combination. The present invention has been completed as a result of the extensive investigations undertaken by the inventors arriving at a discovery that silver ions can be efficiently and selectively separated and recovered from an aqueous solution containing silver ions in an extremely low concentration or containing silver ions together with ions of other kinds of metals by the use of a specific thiophosphate compound.

Namely, the method of the present invention for the recovery of silver value from an aqueous solution containing silver ions comprises the steps of:

(a) bringing the aqueous solution containing silver ions into contact with an organic solution of 0,0-bis(2-ethylhexyl) hydrogen thiophosphate in an organic solvent or into contact with a porous organic resin bearing 0,0-bis(2-ethylhexyl) hydrogen thiophosphate to effect selective transfer of silver ions from the aqueous solution into the organic solution or onto the porous organic resin; and (b) isolating silver from the organic solution by back extraction, for example, with a hydrochloric acid solution containing thiourea or from the porous resin by leaching with an organic solvent to obtain a silver-containing organic solution from which the silver ions are back extracted with a hydrochloric acid solution.

DETAILED DESCRIPTION OF THE PREFERRED EMBODIMENTS

Figure 1:
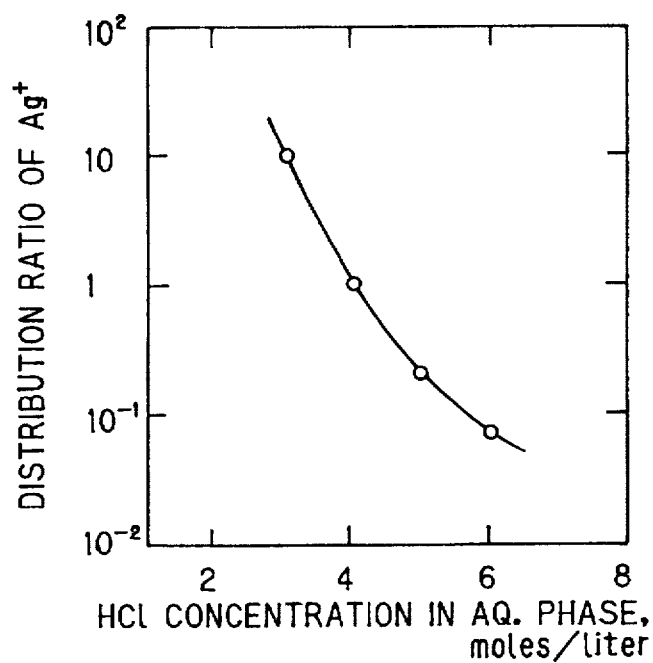
FIG. 1 is a graph obtained in Example 2 showing the distribution ratio of silver ions in the inventive method as a function of the concentration of hydrochloric acid in the aqueous phase.

In the method of the present invention, a specific compound 0,0-bis(2-ethylhexyl) hydrogen thiophosphate is used as a silver collector, which is a known compound expressed by the structural formula

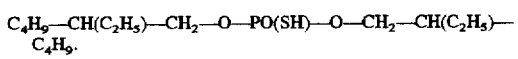

This compound is used as being dissolved in an organic solvent to form a solution or as being supported on a porous organic resin to be brought into contact with a starting aqueous solution containing silver value in the form of silver ions.

The organic solvent used in the preparation of the solution of the above mentioned thiophosphate compound is not particularly limitative provided that the solvent is immiscible with water and the thiophosphate compound can be dissolved therein. Examples of preferable organic solvents include hydrocarbon solvents such as hexane, heptane, octane, benzene, toluene, xylene, kerosine and the like and halogenated hydrocarbon solvents such as chloroform, carbon tetrachloride, trichloroethane and the like in respect of the availability and easiness in handling. The concentration of the thiophosphate compound in the solution is usually in the range from 0.001 to 1 mole/liter or, preferably, in the range from 0.01 to 1 mole/liter.

The porous organic resin to bear the thiophosphate compound is selected from those which are insoluble in water and in the organic solvent used in the step of leaching. Examples of suitable porous organic resins include foamed polyethylenes, foamed polypropylenes, foamed polystyrenes, foamed polyvinyl chlorides, foamed polyurethanes, foamed phenolic resins and the like which may be either crosslinked or uncrosslinked. In particular, foamed resins of cross-linked polymer of an acrylic acid ester are preferred. These porous resins should desirably have no substituent groups having ion exchangeability such as amino groups and sulfonyl groups because these groups influence the absorption behavior of the porous resin to the metal ions. The porous resin is used preferably in the form of a powder having a particle size distribution of 20 to 200 mesh fineness and the resin should have a specific surface area of 50 to 800 m²/g and an average pore diameter of 5 to 40 nm.

The procedure for obtaining the porous organic resin bearing the thiophosphate compound is as follows. Namely, the thiophosphate compound is dissolved in an organic solvent having a relatively low boiling point such as acetone, hexane and the like and the porous resin particles after thorough washing and drying are added to the solution and agitated for several hours followed by evaporation of the solvent to dryness. The amount of the thiophosphate compound supported by the porous resin particles is usually in the range from 1 to 200 parts by weight or, preferably, in the range from 10 to 70 parts by weight per 100 parts by weight of the porous resin powder.

The silver value contained in the starting aqueous solution should be in the form of a monovalent silver ion Ag+ or in the form of a complex thereof having solubility in an aqueous phase. The aqueous solution can contain cations of other metals including alkali metals, alkaline earth metals, aluminum, iron, manganese, nickel, zinc, cadmium, copper and the like and anions including nitrate ions, chloride ions, thiosulfate ions, sulfate ions and the like although sulfate ions and chloride ions are undesirable because these anions form an water-insoluble precipitate with the silver ions. Accordingly, for example, the concentration of chloride ions should be kept sufficiently high, because precipitates of silver chloride can be solubilized in the presence of chloride ions of high concentration by forming chloro complexes, to be at least 1 mole/liter when the concentration of silver ions in the aqueous solution is $10^{-4}$ mole/liter. The concentration of thiosulfate ions in the aqueous solution, on the other hand, should be decreased to 0.1 mole/liter or lower, if necessary by dilution with water because thiosulfate ions have an inhibiting effect on the recovery of the silver value from the aqueous solution.

The pH value of the starting aqueous solution containing silver ions should be adjusted not to exceed 4, if necessary, by the addition of an acid because, when the pH value of the aqueous solution is too high, foaming is sometimes caused when the aqueous solution is brought into contact with the organic solution containing the thiophosphate compound or elimination of the thiophosphate compound from the porous organic resin may take place when the aqueous solution is contacted with the porous resin particles bearing the thiophosphate compound. The acid used for the adjustment of the pH of the aqueous solution is preferably nitric acid because nitric acid has little adverse influences on the formation of precipitates and on the porous resin.

In the method of the present invention, a porous resin bearing the thiophosphate compound can be used also for a starting aqueous solution in which the concentration of silver ions is relatively high while a solution of the thiophosphate compound in an organic solvent is most advantageously applied to a starting aqueous solution of a relatively low silver concentration so that it is advantageous that an aqueous solution of a relatively high silver concentration is subjected beforehand to another method for the recovery of silver such as the solvent extraction method and electrolytic method before the aqueous solution is treated in step (a) of the inventive method.

When the starting aqueous solution contains, besides silver ions, ions of other metals such as aluminum, manganese, nickel, zinc, iron, cadmium and copper, sufficiently selective separation of the silver ions therefrom can be accomplished by adequately adjusting the pH value of the aqueous solution so as to modify the separation factor between the silver ions and the ions of respective other metals.

In step (b) of the inventive method, the silver value contained in the organic solution of the thiophosphate compound is subjected to a back extraction treatment into an aqueous phase which can be performed with a concentrated hydrochloric acid but it is preferable that the back extraction treatment is performed with an aqueous hydrochloric acid solution containing a compound capable of forming a complex with the silver ions such as thiourea. For example, the back extraction treatment can be satisfactorily performed with an aqueous solution containing at least 1 mole/liter of hydrogen chloride and at least 1 mole/liter of thiourea.

When step (a) of the inventive method is performed by using an organic solution containing the thiophosphate compound as the extractant for the silver ions, the extract solution is thoroughly shaken in step (b) with addition of an aqueous hydrochloric acid solution or an aqueous solution containing hydrogen chloride and thiourea so as to back-extract the silver value from the organic phase to the aqueous phase followed by standing of the liquid mixture to effect phase separation into an aqueous phase and an organic phase. When the extract solution contains the thiophosphate compound in a concentration of $10^{-3}$ mole/liter or lower, the back extraction can be performed with a hydrochloric acid solution in a concentration of 6 moles/liter or higher containing no thiourea while, when the extract solution containing the thiophosphate compound in a concentration of $10^{-2}$ mole/liter or higher, it is necessary to use a back-extractant solution containing at least 1 mole/liter of hydrogen chloride and at least 1 mole/liter of thiourea.

A convenient and efficient method for practicing the method of the present invention is that the starting aqueous solution containing silver ions is passed through a column filled with particles or beads of the porous resin bearing the thiophosphate compound to cause adsorption of the silver ions onto the porous resin followed by leaching of the silver ions from the porous resin by passing an organic solvent through the column. The organic solvent used in this leaching treatment is not particularly limitative provided that the solvent can dissolve the thiophosphate compound. Examples of suitable organic solvents include hydrocarbons such as hexane, heptane, benzene, toluene, xylene, kerosine and the like, chlorinated hydrocarbons such as chloroform, dichloromethane, trichloroethane, chlorobenzene and the like and ketones such as acetone, methyl isobutyl ketone, methyl ethyl ketone and the like.

Sufficient leaching of the silver ions can be accomplished by passing the organic solvent in a volume of 2 to 3 times of the empty volume of the column though dependent on the flow rate therethrough. When a water-immiscble organic solvent is used for leaching, the organic solution obtained is subjected to a back extraction treatment with an aqueous hydrogen chloride solution, preferably, containing thiourea. When an organic solvent miscible with water is used for leaching, the solvent is removed by evaporation from the solution and the residue is re-dissolved in a hydrochloric acid solution for further purification.

The inventive method described above can be advantageously applied even to a silver-containing aqueous solution which contains silver ions in an extremely low concentration or contains chloride ions in a high concentration while conventional methods can hardly be applied to such an aqueous solution. Moreover, the inventive method provides a means for selectively recovering the silver value alone from an aqueous solution containing ions of other kinds of metals.

In the following, the method of the present invention is described in more detail by way of examples.

EXAMPLE 1

A 10 ml portion each of five aqueous solutions containing silver nitrate in a concentration of $10^{-5}$ mole/liter and nitric acid in a concentration of 0.001, 0.01, 0.1, 0.5 or 1 mole/liter and having a pH of 3, 2, 1, 0.3 or 0, respectively, was thoroughly shaken for 1 hour together with 10 ml of a heptane solution containing $10^{-4}$ mole/liter of 0,0-bis(2-ethylhexyl) hydrogen thiophosphate for extraction of the silver ions followed by standing of the liquid mixture to effect separation into aqueous and organic phases. The aqueous solution was taken and subjected to the determination of the residual concentration of silver ions by the method of ICP (inductively coupled plasma) atomic emission spectrophotometry to find that the residual concentration of silver was $10^{-8}$ mole/liter or lower corresponding to at least 99.9% extraction in each of the extraction tests.

EXAMPLE 2

A 10 ml portion each of four aqueous solutions containing silver ions in a concentration of $10^{-5}$ mole/liter and hydrogen chloride in a concentration in the range from 3 to 6 moles/liter was thoroughly shaken for 30 minutes together with 10 ml of a heptane solution containing $10^{-3}$ mole/liter of 0,0-bis(2-ethylhexyl) hydrogen thiophosphate for extraction of the silver ions followed by standing of the liquid mixture to effect separation into aqueous and organic phases. The aqueous solution was taken and subjected to the determination of the residual concentration of silver to calculate the distribution ratio of silver ions between the organic phase and the aqueous phase. The results are shown by the graph of FIG. 1 giving the distribution ratio in a logarithmic scale on the ordinate as a function of the concentration of hydrogen chloride in the aqueous phase.

As is understood from this graph, the ratio of the concentration of silver transferred into the organic phase to the residual concentration in the aqueous phase is decreased as the concentration of hydrogen chloride in the aqueous phase is increased.

EXAMPLE 3

Figure 2:
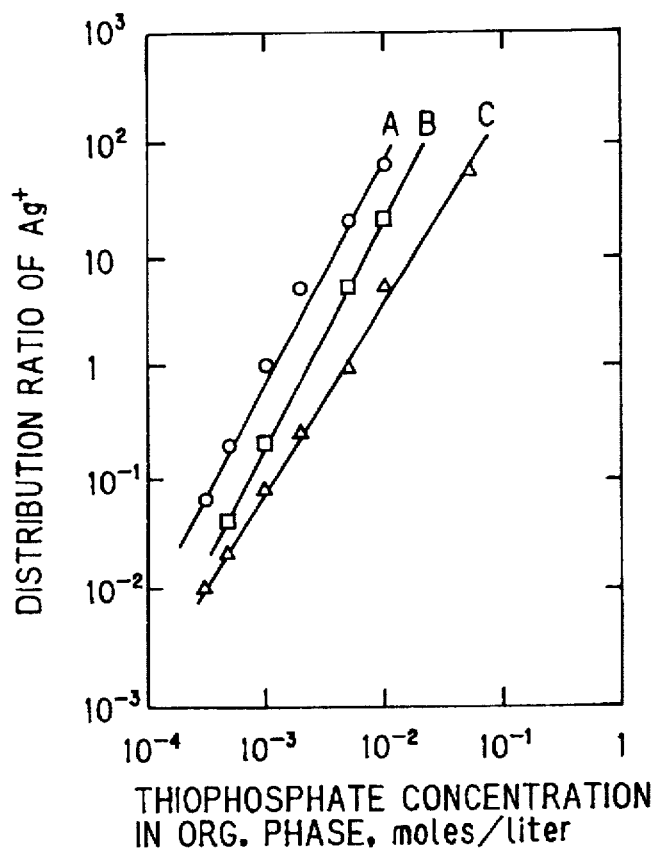
FIG. 2 is a graph obtained in Example 3 showing the distribution ratio of silver ions in the inventive method as a function of the concentration of 0,0-bis(2-ethylhexyl) hydrogen thiophosphate in the organic phase.

A 10 ml portion each of three aqueous solutions containing silver ions in a concentration of $10^{-5}$ mole/liter and hydrogen chloride in a concentration 4, 5 or 6 moles/liter was thoroughly shaken together with 10 ml of a heptane solution of 0,0-bis(2-ethylhexyl) hydrogen thiophosphate in a varied concentration for extraction of silver ions followed by standing of the liquid mixture to effect separation into aqueous and organic phases. The aqueous solution was taken and subjected to the determination of the residual concentration of silver ions to calculate the distribution ratio of silver ions between the organic phase and the aqueous phase. The results are shown by the graph of FIG. 2, in which the curves A, B and C are for the hydrogen chloride concentration of 4, 5 and 6 moles/liter, respectively, giving the distribution ratio in a logarithmic scale as a function of the concentration of hydrogen chloride in the aqueous phase also in a logarithmic scale.

EXAMPLE 4

A 10 ml portion of an aqueous solution containing silver ions in a concentration of $10^{-5}$ mole/liter and hydrogen chloride in a concentration 4 moles/liter, which also contained aluminum ions $Al^{3+}$, iron ions $Fe^{3+}$, nickel ions $Ni^{2+}$, zinc ions $Zn^{2+}$ and cadmium ions $Cd^{2+}$ each in a concentration of $10^{-4}$ mole/liter, was thoroughly shaken for 30 minutes with 10 ml of a heptane solution in a concentration of 0.01 mole/liter 0,0-bis(2-ethylhexyl) hydrogen thiophosphate for extraction of metal ions followed by standing of the liquid mixture to effect separation into aqueous and organic phases. The aqueous solution was taken and subjected to the determination of the residual concentrations of the respective kinds of the metal ions. The results were that, while more than 99% of the silver ions were extracted into the organic phase, the % extraction of none of the other kinds of metal ions exceeded 1%.

EXAMPLE 5

Figure 3:
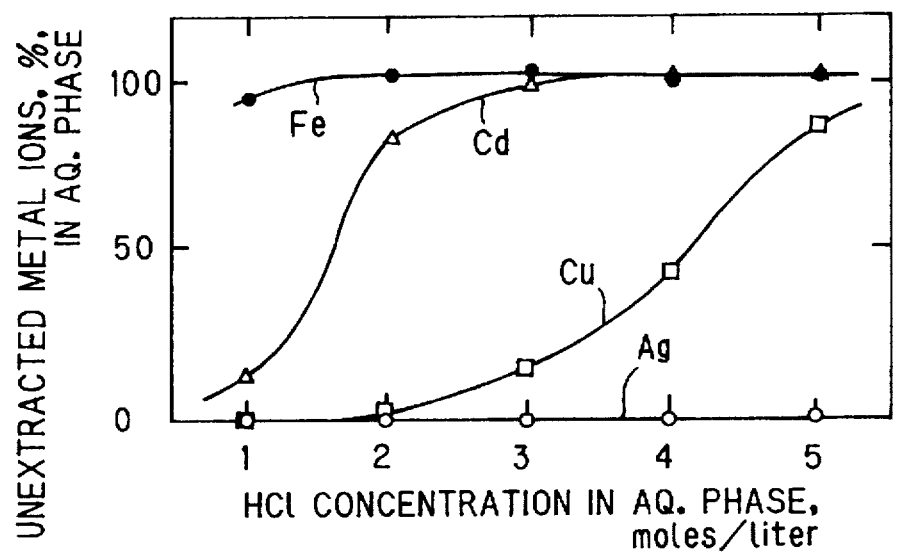
FIG. 3 is a graph obtained in Example 5 showing the residual concentrations of ions of silver, copper, cadmium and iron after extraction as a function of the concentration of hydrochloric acid in the aqueous phase.

A 10 ml portion each of five aqueous solutions containing silver ions in a concentration of $10^{-5}$ mole/liter and hydrogen chloride in a concentration 1 to 5 moles/liter, which also contained manganese ions $Mn^{2+}$, iron ions $Fe^{3+}$, nickel ions $Ni^{2+}$, zinc ions $Zn^{2+}$, copper ions $Cu^{2+}$ and cadmium ions $Cd^{2+}$ each in a concentration of $10^{-4}$ mole/liter, was thoroughly shaken for 1 hour with admixture of 0.1 g, as dried, of thiophosphate-bearing resin beads, which were prepared from 100 parts by weight of porous resin beads of an acrylic acid ester-divinylbenzene copolymer having a specific surface area of 450 $m^2/g$, average pore diameter of 9.0 nm and particle size distribution of 20 to 60 mesh fineness and 100 parts by weight of 0,0-bis(2-ethylhexyl) hydrogen thiophosphate and the aqueous solution freed from the resin beads was subjected to the determination of the residual concentrations of the ions of the respective metals to calculate the values of % immobilization of the metal ions onto the resin particles. The results for the ions of silver, iron, cadmium and copper are shown in FIG. 3 which gives the % unimmobilization, i.e. the ratio of the residual concentration of the metal ions after the resin treatment to the concentration before the treatment, in the ordinate as a function of the hydrogen chloride concentration in the aqueous phase. Absolutely no immobilization was noted for the ions of manganese, nickel and zinc.

EXAMPLE 6

A cylindrical column having an inner diameter of 8 mm and a length of 50 mm was filled with 1.00 g of the same thiophosphate-bearing resin beads as used in Example 5 to form a resin bed through which 20 ml of an aqueous solution containing $10^{-6}$ mole/liter of silver ions, 1 mole/liter of sodium chloride and 0.1 mole/liter of hydrogen chloride were passed at a flow rate of about 48 ml/hour and the outflow solution was taken in fractions which were subjected to the determination of the concentration of silver ions therein to find that silver ions could not be detected in each of the fractions.

EXAMPLE 7

Figure 4:
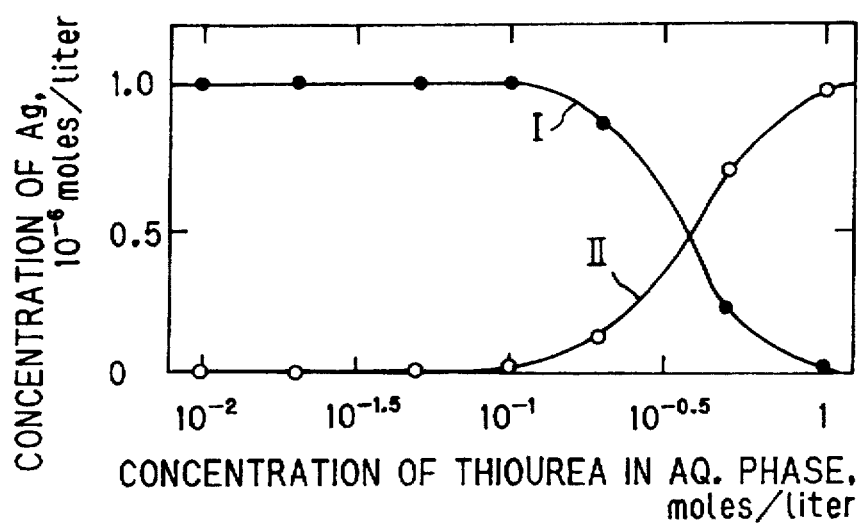
FIG. 4 is a graph obtained in Example 7 showing the residual concentration of silver ions in the aqueous and organic phases after back extraction as a function of the concentration of thiourea in the aqueous phase.

A 10 ml portion of an aqueous solution containing silver nitrate in a concentration of $10^{-5}$ mole/liter was thoroughly shaken for 1 hour together with 10 ml of a heptane solution containing 0.1 mole/liter of 0,0-bis(2-ethylhexyl) hydrogen thiophosphate so as to completely transfer the silver ions from the aqueous phase to the organic phase followed by standing of the liquid mixture to effect phase separation into aqueous and organic phases. The organic solution was taken and shaken with 10 ml of an aqueous solution containing hydrogen chloride in a concentration of 2 moles/liter and thiourea in a varied concentration to effect back extraction of the silver ions into the aqueous phase. The aqueous and organic solutions taken by phase separation were each subjected to the determination of the concentration of silver ions to give the results shown in FIG. 4. in which the curve I is for the organic solution and the curve II is for the aqueous solution, as a function of the concentration of thiourea in the aqueous solution in a logarithmic scale.

As is understood from this figure, the back extraction of silver from the organic to the aqueous phase is complete when the aqueous phase contains thiourea in a concentration of 1 mole/liter or higher.

EXAMPLE 8

A 25 ml portion of a depleted photographic fixing solution containing about 350 ppm by weight of silver was acidified by the addition of 1 ml of concentrated hydrochloric acid and diluted with 250 ml of water. After standing as such overnight, the thus diluted aqueous solution was filtered through filter paper to remove insoluble matter. A 10 ml portion of the filtrate was shaken with addition of 0.1 g of the same thiophosphate-bearing porous resin beads as used in Example 5 and small portions of the aqueous phase were periodically taken and analyzed for the residual concentration of the silver ions to find that about 97% and about 99% of the silver ions in the starting aqueous solution were immobilized onto the resin beads after 1 hour and after 6 hours, respectively, of shaking.

What is claimed is:

1. A method for the recovery of silver value from an aqueous solution containing silver ions which comprises the steps of:
   (a) bringing the aqueous solution containing silver ions into contact with an organic solution of O,O-bis(2-ethylhexyl) hydrogen thiophosphate in an organic solvent to effect extraction of the silver ions into the organic solution; and
   (b) back-extracting silver ions from the organic solution with an aqueous solution of hydrogen chloride containing thiourea.

2. The method for the recovery of silver value from an aqueous solution containing silver ions as claimed in claim 1 in which the organic solvent is selected from the group consisting of hydrocarbon compounds and halogenated hydrocarbon compounds.

3. The method for the recovery of silver value from an aqueous solution containing silver ions as claimed in claim 1 in which the pH value of the aqueous solution containing silver ions is adjusted to 4 or lower prior to step (a).

4. The method for the recovery of silver value from an aqueous solution containing silver ions as claimed in claim 1 in which the aqueous solution for the back extraction of silver ions from the organic solution in step (b) contains at least 1 mole/liter of hydrogen chloride and at least 1 mole/liter of thiourea.

5. The method for the recovery of silver value from an aqueous solution containing silver ions as claimed in claim 1 in which the organic solution for the extraction of silver ions from the aqueous solution in step (a) contains O,O-bis(2-ethylhexyl) hydrogen thiophosphate in a concentration in the range from 0.001 to 1 mole/liter.

6. A method for the recovery of silver value from an aqueous solution containing silver ions which comprises the steps of:
   (a) bringing the aqueous solution containing silver ions into contact with a porous organic resin bearing O,O-bis(2-ethylhexyl) hydrogen thiophosphate to effect adsorption of silver ions from the aqueous solution onto the porous resin; and
   (b) leaching out the silver ions from the porous organic resin with an organic solvent.

7. The method for the recovery of silver value from an aqueous solution containing silver ions as claimed in claim 6 in which the porous organic resin is in the form of a powder having a specific surface area in the range from 50 to 800 $m^2/g$, an average pore diameter in the range from 5 to 40 nm and a particle size distribution in the range from 20 to 200 mesh fineness.

8. The method for the recovery of silver value from an aqueous solution containing silver ions as claimed in claim 6 in which the amount of the O,O-bis(2-ethylhexyl) hydrogen thiophosphate is in the range from 1 to 200 parts by weight per 100 parts by weight of the porous organic resin.

9. The method for the recovery of silver value from an aqueous solution containing silver ions as claimed in claim 6 in which the porous organic resin is a foamed resin which is a crosslinked copolymer of an acrylic acid ester.

10. The method for the recovery of silver value from an aqueous solution containing silver ions as claimed in claim 6 in which the organic solvent used in step (b) is selected from the group consisting of hydrocarbons, chlorinated hydrocarbons and ketones.

* * * * *